US010004243B2

(12) United States Patent
Hajime et al.

(10) Patent No.: US 10,004,243 B2
(45) Date of Patent: Jun. 26, 2018

(54) ETHYLENE REMOVAL AGENT

(71) Applicant: 3M INNOVATIVE PROPERTIES COMPANY, St. Paul, MN (US)

(72) Inventors: Evan Koon Lun Yuuji Hajime, Woodbury, MN (US); Badri Veeraraghavan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/220,859

(22) Filed: Jul. 27, 2016

(65) Prior Publication Data

US 2016/0330986 A1 Nov. 17, 2016

Related U.S. Application Data

(63) Continuation of application No. 14/367,790, filed as application No. PCT/US2012/069104 on Dec. 12, 2012, now abandoned.
(Continued)

(51) Int. Cl.
| | | |
|---|---|---|
| *A23B 7/152* | (2006.01) | |
| *B01D 53/04* | (2006.01) | |
| *B01J 20/02* | (2006.01) | |
| *B01J 20/20* | (2006.01) | |
| *B01J 20/26* | (2006.01) | |
| *B01J 20/28* | (2006.01) | |
| *B01J 20/32* | (2006.01) | |
| *B01J 23/62* | (2006.01) | |
| *A23B 7/153* | (2006.01) | |
| *B01J 23/52* | (2006.01) | |
| *B01J 37/26* | (2006.01) | |
| *B01J 37/34* | (2006.01) | |
| *B01J 23/66* | (2006.01) | |
| *B01J 23/89* | (2006.01) | |
| *B01J 29/068* | (2006.01) | |
| *B01J 35/00* | (2006.01) | |
| *B01J 37/02* | (2006.01) | |
| *B01J 20/06* | (2006.01) | |
(Continued)

(52) U.S. Cl.
CPC ............. *A23B 7/152* (2013.01); *A23B 7/153* (2013.01); *B01D 53/04* (2013.01); *B01J 20/02* (2013.01); *B01J 20/0233* (2013.01); *B01J 20/06* (2013.01); *B01J 20/08* (2013.01); *B01J 20/103* (2013.01); *B01J 20/18* (2013.01); *B01J 20/20* (2013.01); *B01J 20/26* (2013.01); *B01J 20/261* (2013.01); *B01J 20/262* (2013.01); *B01J 20/28004* (2013.01); *B01J 20/2805* (2013.01); *B01J 20/28007* (2013.01); *B01J 20/28016* (2013.01); *B01J 20/3204* (2013.01); *B01J 20/327* (2013.01); *B01J 20/3236* (2013.01); *B01J 20/3272* (2013.01); *B01J 20/3293* (2013.01); *B01J 20/3295* (2013.01); *B01J 23/52* (2013.01); *B01J 23/62* (2013.01); *B01J 23/66* (2013.01); *B01J 23/89* (2013.01); *B01J 29/068* (2013.01); *B01J 35/006* (2013.01); *B01J 35/008* (2013.01); *B01J 35/0013* (2013.01); *B01J 37/0217* (2013.01); *B01J 37/26* (2013.01); *B01J 37/347* (2013.01); *A23V 2002/00* (2013.01); *A23V 2200/00* (2013.01); *B01J 21/18* (2013.01); *B01J 27/12* (2013.01); *B01J 35/023* (2013.01); *B01J 35/06* (2013.01); *B01J 37/0221* (2013.01); *B01J 2229/18* (2013.01)

(58) Field of Classification Search
CPC ........ A23B 7/152; A23B 7/153; B01D 53/04; B01J 23/52; B01J 23/66; B01J 23/89; B01J 29/068; B01J 37/0217; B01J 37/26; B01J 37/347; B01J 20/02; B01J 20/0233; B01J 20/06; B01J 20/08; B01J 20/103; B01J 20/18; B01J 20/20; B01J 20/26; B01J 20/261; B01J 20/262; B01J 20/28004; B01J 20/28007; B01J 20/28016; B01J 20/2805; B01J 20/3204; B01J 20/3236; B01J 20/327; B01J 20/3272; B01J 20/3293; B01J 20/3295; B01J 23/62; B01J 35/0013; B01J 35/006; B01J 35/008; B01J 21/18; B01J 27/12; B01J 35/023; B01J 35/06; B01J 37/0221; B01J 2229/18; A23V 2002/00; A23V 2200/00
See application file for complete search history.

(56) References Cited

U.S. PATENT DOCUMENTS

| | | | | |
|---|---|---|---|---|
| 4,451,915 A | * | 5/1984 | LaBudde | ................. G11B 7/08 346/135.1 |
| 4,618,525 A | | 10/1986 | Chamberlain | |

(Continued)

FOREIGN PATENT DOCUMENTS

| | | |
|---|---|---|
| CN | 101077848 | 11/2007 |
| EP | 2316567 | 5/2011 |

(Continued)

OTHER PUBLICATIONS

Ahn, "Complete Oxidation of Ethylene over Supported Gold Nanoparticle Catalysts", Journal of Nanoscience and Nanotechnology, 2006, vol. 6, pp. 3599-3603.
(Continued)

*Primary Examiner* — Anthony Weier
(74) *Attorney, Agent, or Firm* — Qiang Han

(57) ABSTRACT

A composite particle having a fluorinated surface and a discontinuous layer of gold nanoparticles disposed on the fluorinated surface, articles that include such particles, and methods of using the particles and the articles for removal of ethylene.

12 Claims, 1 Drawing Sheet

Related U.S. Application Data

(60) Provisional application No. 61/579,041, filed on Dec. 12, 2011.

(51) Int. Cl.
| | | |
|---|---|---|
| *B01J 20/08* | (2006.01) | |
| *B01J 20/18* | (2006.01) | |
| *B01J 20/10* | (2006.01) | |
| *B01J 21/18* | (2006.01) | |
| *B01J 27/12* | (2006.01) | |
| *B01J 35/02* | (2006.01) | |
| *B01J 35/06* | (2006.01) | |

(56) References Cited

U.S. PATENT DOCUMENTS

| | | | |
|---|---|---|---|
| 4,917,820 | A | 4/1990 | Matsumoto |
| 5,015,282 | A | 5/1991 | Takahashi |
| 5,795,370 | A | 8/1998 | Garrett |
| 5,827,348 | A | 10/1998 | Waddell |
| 6,042,797 | A | 3/2000 | Ogawa |
| 6,197,269 | B1 | 3/2001 | Jansen |
| 6,252,095 | B1 | 6/2001 | Hayashi |
| 7,560,013 | B2 | 7/2009 | Shekarriz |
| 7,648,834 | B2 * | 1/2010 | Moore ............ G01N 33/54373 435/287.1 |
| 7,727,931 | B2 | 6/2010 | Brey |
| 7,902,119 | B2 * | 3/2011 | Wu .................... H01L 39/2448 427/62 |
| 8,058,202 | B2 | 11/2011 | Brady |
| 2004/0231511 | A1 | 11/2004 | Karwacki |
| 2006/0148971 | A1 | 7/2006 | Jing |
| 2007/0207079 | A1 | 9/2007 | Brady |
| 2008/0157665 | A1 | 7/2008 | Wu |
| 2009/0054230 | A1 | 2/2009 | Veeraraghavan |
| 2009/0166612 | A1 | 7/2009 | Cain |
| 2010/0068749 | A1 | 3/2010 | Bauer |
| 2012/0080668 | A1 | 4/2012 | Seki |

FOREIGN PATENT DOCUMENTS

| | | |
|---|---|---|
| JP | 2006-111922 | 4/2006 |
| JP | 2010-510048 | 4/2010 |
| WO | WO 99/43431 | 9/1999 |
| WO | WO 2006-074126 | 7/2006 |
| WO | WO 2008/035347 A2 | 3/2008 |
| WO | WO 2008/063880 A1 | 5/2008 |

OTHER PUBLICATIONS

Blanke, "Gold Nanoparticles and Sensor Technology for sensitive Ethylene Detection", Acta Horticulture, 2012, vol. 934, pp. 255-262.
Delannoy, "Preparation of Supported Gold Nanoparticles by a Modified Incipient Wetness Impregnation Method", Journal of Physical Chemistry B, 2006, vol. 110, pp. 22471-22478.
Hertwig, A Comparative Computation Study of Cationic Coinage Metal-Ethylene Complexes $(C_2H_4)M^+$ (M=Cu, Ag, and Au), Journal of Physical Chemistry, 1996, vol. 100, pp. 12253-12260.
Hopkinson, "Gold Catalysis and Fluorine." Israel Journal of Chemistry, 2010, vol. 50, pp. 675-690.
Li, "Efficient Elimination of Trace Ethylene over Nano-Gold Catalyst under Ambient Conditions", Environmental Science and Technology, 2008, vol. 42, pp. 8947-8951.
Ma, "Mesoporous $Co_3O_4$ and $Au/Co_3O_4$ Catalysts for Low-Temperature Oxidation of Trace Ethylene", Journal of the American Chemical Society, 2010, vol. 132, pp. 2608-2613.
Negoi, "One-Pot Synthesis of Menthol Catalyzed by a Highly Diastereoselective $Au/MgF_2$ Catalyst", Angewandte Chemie International Edition, 2010, vol. 49, pp. 8134-8138.
Shekarriz, "Nanoporous Gold Electrocatalysis for Ethylene Monitoring and Control." European Journal of Horticultural Science, 2008, vol. 73, No. 4, pp. 171-176.
Tilley, "Preparation of Large Scale Monolayers of Gold Nanoparticles on Modified Silicon Substrates Using a Controlled Pulling Method", Langmuir 2003. vol. 19, pp. 5115-5120.
Tomska-Foralewska, "Effect of MgO content in the support of $Au/MgF_2$-MgO catalysts on CO oxidation", Reaction Kinetics Mechanisms and Catalysis, 2010, vol. 100, pp. 111-121.
Venables, "Nucleation and growth of thin films", Reports on Progress on Physics, 1984, vol. 47, pp. 399-459.
Wang, "Fluorine-Enabled Cationic Gold Catalysis: Functionalized Hydration of Alkynes." Angewandte Chemie International Edition, 2010, vol. 49, pp. 7247-7252.
International Search Report for PCT International Application No. PCT\US2012/069104, dated Mar. 29, 2013, 4pgs.
Extended European Search Report, EP 12860715.7, dated Aug. 8, 2015, 3 pages.

* cited by examiner

ETHYLENE REMOVAL AGENT

The present application is a continuation of U.S. application Ser. No. 14/367,790, filed Jun. 20, 2014, now abandoned.

BACKGROUND

Ethylene removal is one of the main methods for fruit and flower preservation during transport and storage after harvesting. The removal of ethylene is commonly achieved with adsorbents such as activated carbon or zeolite materials, or with a stoichiometric oxidant (e.g., potassium permanganate), or with a catalytic oxidant at an elevated temperature, or even with a stoichometric cycloaddition reaction (e.g., a Diels-Alder reaction of ethylene with a tetrazine compound).

SUMMARY

In one aspect, the present disclosure describes a composite particle comprising: a fluorinated surface; and a discontinuous layer of gold nanoparticles disposed on the fluorinated surface.

In another aspect, the present disclosure describes an article comprising a substrate; a plurality of composite particles disposed on a surface of the substrate, within the substrate, or both; wherein individual composite particles in the plurality of composite particles comprise: a fluorinated surface; and a discontinuous layer of gold nanoparticles disposed on the fluorinated surface.

In another aspect, the present disclosure describes an article comprising a container; a plurality of composite particles disposed within the container; wherein individual composite particles in the plurality of composite particles comprise: a fluorinated surface; and a discontinuous layer of gold nanoparticles disposed on the fluorinated surface.

In another aspect, the present disclosure describes a method of removing ethylene, the method comprising: placing an ethylene removal agent in proximity to an ethylene-generating source, wherein the ethylene removal agent comprises: a plurality of composite particles, wherein individual composite particles in the plurality of composite particles comprise: a fluorinated surface; and a discontinuous layer of gold nanoparticles disposed on the fluorinated surface.

The features and advantages of the present disclosure will be further understood upon consideration of the detailed description as well as the appended claims.

DETAILED DESCRIPTION

Figure 1:
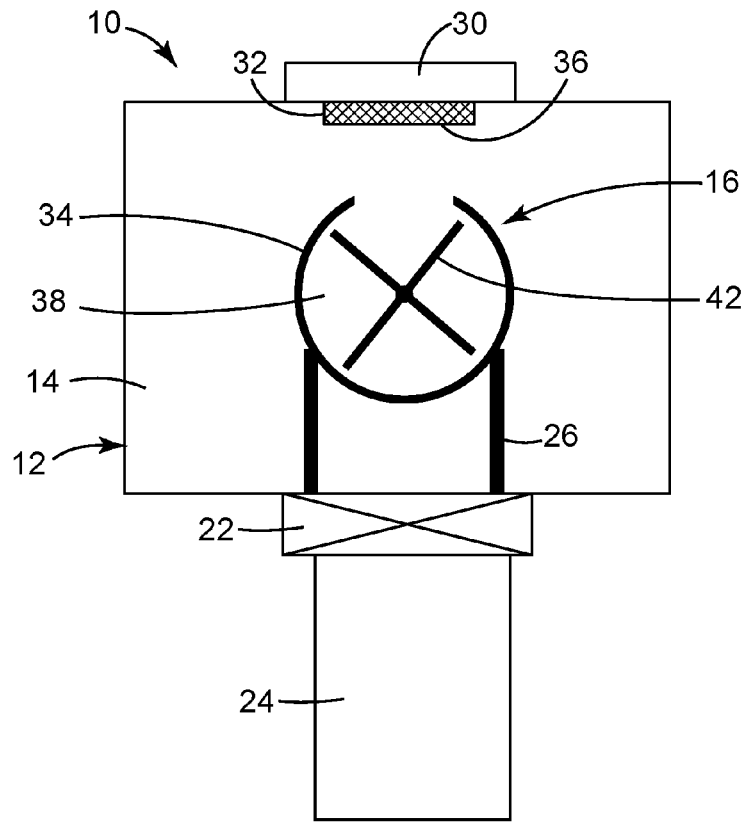
FIG. 1 is a schematic side view of an apparatus for carrying out a physical vapor deposition (PVD) process for depositing gold onto a particle.

In embodiments of the present description, a composite particle includes a discontinuous layer of gold nanoparticles disposed on a fluorinated surface. We have observed that composite particles of the present description have utility for removing ethylene generated by an ethylene-generating source (i.e., as an ethylene removal agent). Composite particles that remove ethylene generated by an ethylene-generating source can have utility, for example, in the preservation of harvested fruits, harvested vegetables, and harvested flowers.

In some embodiments, composite particles of the present disclosure have a particle size in a range from 0.1 micrometer to 10000 micrometers (in some embodiments, from 0.1 micrometer to 1000 micrometers, from 0.1 micrometer to 100 micrometers, from 0.1 micrometer to 10 micrometers, or even from 0.1 micrometer to 1 micrometer; in some embodiments, from 100 micrometers to 10000 micrometers, from 500 micrometers to 5000 micrometers, or even from 500 micrometers to 2000 micrometers; in some embodiments, from 3 micrometers to 1000 micrometers, or even from 5 micrometers to about 500 micrometers). The particle size is typically an average particle size for a plurality of the composite particles; for non-spherical particles, the particle size is the largest dimension of the particle.

In some embodiments, composite particles of the present disclosure have an aspect ratio up to 1:10000 (in some embodiments up to 1:1000, up to 1:100, up to 1:10, up to 1:5, up to 1:2, and even up to 1:1). Aspect ratio refers to the ratio of the average particle width to the average particle length (i.e., the ratio of the shortest particle dimension to the longest particle dimension).

The fluorinated surface of the present description may comprise a highly fluorinated material. "Highly fluorinated" means containing fluorine in an amount of 40 wt % or more (in some embodiments, 50 wt % or more, 60 wt % or more, 70 wt % or more, 80 wt % or more, 90 wt % or more, or even 95 wt % or more). In some embodiments, the fluorinated surface comprises a perfluorinated material. An example of a suitable perfluorinated material is polytetrafluoroethylene ("PTFE"). Other suitable highly fluorinated and perfluorinated materials include, but are not limited to, partially or completely fluorinated polysiloxanes, poly(acrylates), polymethacrylates and polystyrenes.

Gold is widely known as a noble, relatively inert metal with a yellowish color. However, the characteristics of gold can change dramatically in nanoscale (i.e., less than 100 nanometers) regimes (especially at the lower end of nanoscale regimes; for example, at size ranges characterized by at least one dimension being less than about 10 nanometers ("nm") in size), where gold can become catalytically active.

In embodiments of the description, a discontinuous layer of gold nanoparticles is disposed on the fluorinated surface. "Discontinuous" refers to an arrangement of the gold nanoparticles in "island-like regions" on the fluorinated surface. Typically, having gold nanoparticles arranged in a discontinuous layer on the fluorinated surface of the composite particles results in composite particles that are electrically nonconductive. "Electrically nonconductive" as used herein refers to composite particles having a powder volume resistivity value (determined as described in the Examples section), wherein the powder volume resistivity value is at least $1 \times 10^6$ ohm.cm.

The "island-like regions" of gold nanoparticles that make up the discontinuous layer may have all dimensions (for example, nanoparticle diameter or atom cluster diameter) in a range of up to (i.e., less than or equal to) 5 nm in average size (in some embodiments, up to 4 nm in average size, up to about 3 nm in average size, or even up to about 2 nm in average size). In some embodiments, the island-like regions of gold nanoparticles are at least 0.1 nm in at least one dimension (in some embodiments, at least 0.5 nm in at least one dimension), and no greater than the above-described upper limits. This fine-nanoscale gold is further described, for example, in U.S. Published Patent App. No. 2009/0054230 (Badri et al.).

In embodiments of the present description, the discontinuous layer of gold nanoparticles is deposited on the fluorinated surface using physical vapor deposition. Physical vapor deposition ("PVD") refers to the physical transfer of gold from a gold-containing source or target to a surface of a substrate. PVD may be viewed as involving atom-by-atom deposition, although in actual practice, the gold may be transferred as extremely fine bodies constituting more than one atom per body. Once at the fluorinated surface, the gold may interact with the surface physically, chemically, or ionically. Methods for conducting PVD to deposit gold nanoparticles on a substrate surface are further described in, for example, U.S. Pat. No. 8,058,202 (Brady et al.) and U.S. Published Patent Application No. 2009/0054230 (Veeraraghavan et al.).

The amount of gold provided on the fluorinated surface can vary over a wide range. However, since gold is expensive, it is desirable not to use more gold than is reasonably needed to achieve a desired degree of ethylene removal activity. Additionally, because nanoscale gold is highly mobile when deposited using PVD, ethylene removal activity may be compromised if too much gold is used, due to coalescence of at least some of the gold into larger bodies, which in turn may reduce catalytic activity of the gold, for example.

In some embodiments of the composite particles of the present disclosure, the discontinuous layer of gold nanoparticles is in a range from 0.05 wt % to 5 wt % (in some embodiments, in a range from 0.05 wt % to 4 wt %, from 0.05 wt % to 3 wt %, from 0.05 wt % to 2 wt %, from 0.05 wt % to 1 wt %, from 0.1 wt % to 5 wt %, or even from 0.1 to 1 wt %), relative to the composite particle.

In typical embodiments of a PVD process of the present disclosure, the PVD process is discontinued before the powder volume resistivity of a plurality of the composite particle becomes lower than $1 \times 10^6$ ohm.cm, and the plurality of composite particles is then isolated. Without being bound by theory, it is thought that the nonconductive layer of gold nanoparticles is nonconductive due to a low level of contact among the gold nanoparticles in the nonconductive layer. An exemplary embodiment of the method of forming composite particles of the present description using a PVD process is included in the Examples section, where the powder volume resistivity was observed to be greater than $2 \times 10^6$ ohm.cm.

In some embodiments, the fluorinated surface is a fluorinated coating on a core particle. The core particle can be any of a wide range of suitable materials. In some embodiments, the core particle can comprise any of carbonaceous material, zeolite, or metal oxide.

Examples of carbonaceous material suitable for core particles of the present disclosure include any of pyrolyzed coconut-derived carbons, coal-based carbons, and carbon blacks. Typical examples of carbonaceous material useful for core particles of the present disclosure include any of graphite and activated carbon, or combinations thereof, including that commercially available granular activated carbon (12×20 mesh; i.e., having a particle size in a range from about 0.8 mm to about 1.7 mm) available under trade designation "KURARAY GG 12×20" from Kuraray Chemical Company (Osaka, Japan).

It has been demonstrated that gold can be deposited by PVD techniques (for example, by sputtering) to form catalytically active, fine-nanoscale particles or atom clusters on a nanoparticulate core particle surface (see, for example, U.S. Pat. No. 8,058,202, Brady et al.). Without being bound by theory, it is generally believed that there are 3 possible modes of thin film nucleation and growth mechanism (see, e.g., "Nucleation and Growth of Thin Films", Reports on Progress in Physics, 1984, Vol. 47, issue 4, pp. 399-459 for description of different modes of film growth mechanisms). Uniform coverage of a substrate by the depositing film by the layer-by-layer growth is called Frank-Van der Merwe growth mode. Depositions facilitated by nucleation and agglomeration of islands is called Volmer-Weber growth mode. A third mode, Stranski-Krastinov mode, describes a combination of the first two modes. PVD deposition of on low surface energy materials (e.g., the highly fluorinated or perfluorinated materials of the present disclosure) may facilitate a Volmer-Weber type island growth mode on the fluorinated surface of the composite particles.

For some carbonaceous materials, it can be desirable to incorporate an activating agent comprising one or more constituents into the desired support. Such incorporation can occur in any desired manner. Incipient wetness impregnation is one suitable technique. Incipient wetness impregnation can involve slowly adding a solution comprising the desired activating agent to dry support media with mixing. If more than one species of activating agent is to be added, these can be added together, separately, or in overlapping fashion. After impregnation, the support media can be dried and optionally calcined (thermal treatment). Examples of useful impregnants include one or more metals, metal alloys, intermetallic compositions, and/or compounds containing one or more of Cu, Zn, Mo, Ag, Ni, V, W, Y, Co, and the like, and combinations thereof. The metals typically can be impregnated as salts and may be converted to other forms (for example, oxides) during some modes of impregnation.

The selection of which one or more transition metal compounds to incorporate into the core particle can depend upon the desired range of properties. For example, Mo, V, and Y or W can independently help to remove gases such as cyanogen chloride and hydrogen cyanide from air streams when used in combination with a Cu impregnant.

Impregnants can be incorporated into carbonaceous materials in accordance with conventional practices. Such impregnants can typically be provided as salts, oxides, carbonates, and the like and can be impregnated via solution processing, sublimation processing, fluidized bed processing, and the like. Preferably, such impregnation occurs prior to gold deposition. The amount of impregnant utilized can vary widely (for example, from about 0.01 to about 20 weight percent, based upon the total weight of carbonaceous material), depending upon the nature of the impregnant, the nature of the support, and the properties desired.

Suitable examples of zeolite materials for core particles of the present disclosure include any of zeolite 3A, zeolite 4A, zeolite 5A, zeolite 13X, or zeolite 13Y.

Suitable examples of metal oxide materials for core particles of the present disclosure include any of titania, alumina, silica, or combinations thereof.

In embodiments of composite particles that include a core particle, a fluorinated surface is typically provided by forming a fluorinated coating on at least a portion of the outer surface of the core particle. Typical methods for providing the fluorinated coating include any of plasma fluorination of the core particle surface, plasma polymerization of fluorinated polymers onto the core particle surface, gas phase fluorination of core particle surface, dry mixing of core particle and fluorinated media, spray coating of core particle with fluorinated media, or immersion/dip coating of core particle into solution containing fluorinated agent or fluorinated media. The core particle may also contain a fluorine component throughout the bulk of the material as in inorganic fluorides, including, but not being limited to, alkali fluorides, alkaline earth fluorides and transition metal fluorides. Other examples of core particles include fluoropolymers prepared using at least one fluorinated monomer.

The core particles may have porosity in the range of micropores, mesopores, macropores or any such combination of ranges. The fluorinated coating may be present on the outer exterior surface of the core particle but may also be present at least partially within some of the interior pore surfaces of the core particle. The gold nanoparticles may also be present on both exterior and interior surfaces of the fluorinated coating and/or the core particle.

In some embodiments, the core particle is suitable for removing moisture from the surrounding environment. The moisture may be in the form of humidity in surrounding air. The core particle may have a capacity for absorbing moisture from the surrounding air.

In some embodiments, the core particle is an adsorbent for volatile organic compounds. Examples of volatile organic compounds can include volatile amines and volatile organosulfide compounds, many of which may be odiferous.

In an embodiment of a method of making a composite particle, a core particle having a fluorinated surface is provided, and gold nanoparticles are deposited on the fluorinated surface using PVD, to provide a discontinuous layer of gold nanoparticles on the fluorinated surface; discontinuing the PVD process prior to the powder volume resistivity value becoming lower than $1 \times 10^6$ ohm.cm, and then isolating the composite particle having the discontinuous layer of gold nanoparticles disposed on the fluorinated surface.

Physical vapor deposition preferably occurs under temperature and vacuum conditions in which gold is quite mobile and will tend to migrate on the surface of the support medium until immobilized in some fashion (for example, by adhering to a site on or very near the support surface). Sites of adhering can include defects such as surface vacancies, structural discontinuities such as steps and dislocations, and interfacial boundaries between phases or crystals or other gold species such as small gold clusters.

Physical vapor deposition can be carried out in various different ways. Representative approaches include sputter deposition (preferred), evaporation, and cathodic arc deposition. Any of these or other PVD approaches can be used in the process of the invention, although the nature of the PVD technique may impact the resulting nanogold activity.

For example, the energy of the physical vapor deposition technique can impact the mobility of the deposited gold and hence its tendency to coalesce. Higher energy tends to correspond to an increased tendency of the gold to coalesce. Increased coalescence, in turn, tends to reduce catalytic activity when the material is used as a nanogold catalyst. Generally, the energy of the depositing species is lowest for evaporation, higher for sputter deposition (which can include some ion content in which a small fraction of the impinging metal species are ionized), and highest for cathodic arc deposition (which can include several tens of percents of ion content). Accordingly, if a particular PVD technique yields deposited gold that is more mobile than desired, it can be useful to use a PVD technique of lesser energy instead.

Physical vapor deposition preferably is performed while the support medium to be treated is being well-mixed (e.g., tumbled, fluidized, or milled) to ensure adequate treatment of support surfaces. The tumbling of particles in a vacuum chamber during PVD is described, for example, in U.S. Pat. No. 4,618,525 (Chamberlain et al.).

In some embodiments of a method of the present disclosure, an ethylene removal agent is placed in proximity to an ethylene-generating source. The ethylene removal agent comprises a plurality of the composite particles of the present disclosure (i.e., a plurality of any of the composite particles having the discontinuous layer of gold nanoparticles disposed on the fluorinated surface of the composite particles).

"In proximity to" refers to being sufficiently close to the ethylene-generating source to permit ethylene from the ethylene generating source to reach the ethylene-removal agent. In some typical embodiments, the ethylene removal agent is placed within 10 meters (in some embodiments, within 5 meters, within 2 meters, within 1 meter, within 10 cm, within 5 cm, within 2 cm, or even within 1 cm) of the ethylene-generating source. In some embodiments, the ethylene removal agent is placed directly against the ethylene generating source.

In some embodiments, the ethylene removal agent is placed in a closed system together with the ethylene-generating source. "Closed system" refers to any of a normally closed container, or a plurality of interconnected containers, wherein ethylene gas can move from the ethylene-generating source to the ethylene removal agent. In some embodiments, the closed system includes means for augmenting gas flow from the ethylene generating source to ethylene removal agent.

In some embodiments, means for augmenting gas flow from the ethylene-generating source to the ethylene removal agent typically includes any of a fan, a pump, or any other means for increasing gas flow beyond diffusion. In some embodiments, gas flow can be augmented by a temperature differential.

In some embodiments, the ethylene-generating source is any of harvested fruits, harvested vegetables, or harvested flowers.

The ethylene removal agent of the present disclosure can be incorporated into a wide range of articles useful for removing ethylene gas generated by an ethylene-generating source. In some embodiments, an article of the present disclosure includes a substrate having a plurality of any of the composite particles of the present description disposed on a surface of the substrate, disposed within the substrate, or both. A wide range of substrates can be used. Many types of materials will be suitable for use as substrates, including polymeric materials, ceramic materials, metallic materials, and composites of any or all of these. In some embodiments, the substrate is in a form of any of a sheet, a film, a nonwoven web, or a plurality of particles. In some embodiments, the substrate comprises filter media.

In some embodiments, an article of the present disclosure includes a container having the ethylene removal agent of the present description disposed within the container. In some embodiments, the container can be any of a permeable bag, a tube defining an inlet and an outlet, or a nonwoven fibrous web. The container is selected to allow for a flow of gas to and from the ethylene removal agent.

Suitable examples of a permeable bag include woven or non-woven fabric (e.g., cotton, nylon, or combinations thereof) bags, flashspun high-density polyethylene fiber (e.g., "TYVEK" material from DuPont, Wilmington, Del.) polymer permeable bags, and permeable bags made from particle-embedded polyethylene or other polymeric film.

In articles where the container is a tube defining an inlet and an outlet, any suitable tube dimension or shape may be used. Typically, the tube includes a filter or frit to retain the ethylene removal agent within the tube, while allowing gas from the ethylene-generating source to flow through the tube.

Ethylene removal agents of the present disclosure are useful in, for example, refrigeration systems, especially refrigeration systems used for the preservation of harvested fruits, harvested vegetables, or harvested flowers.

Embodiments

Item 1. A composite particle comprising:
 a fluorinated surface; and
 a discontinuous layer of gold nanoparticles disposed on the fluorinated surface.
Item 2. The composite particle of item 1, wherein the fluorinated surface is a fluorinated coating on a core particle.
Item 3. The composite particle of item 2, wherein the core particle comprises any of carbonaceous material, zeolite, or metal oxide.
Item 4. The composite particle of item 2, wherein the core particle comprises activated carbon.
Item 5. The composite particle of any preceding item, wherein the composite particle has an aspect ratio up to 1:10000.
Item 6. The composite particle of any preceding item, wherein the composite particle has a size in a range of from 0.1 micrometer to 10000 micrometers.
Item 7. The composite particle of any preceding item, wherein the fluorinated surface comprises polytetrafluoroethylene.
Item 8. The composite particle of any preceding item, wherein the core particle is suitable for removing moisture.
Item 9. The composite particle of any preceding item, wherein the core particle is an adsorbent for volatile organic compounds.
Item 10. The composite particle of any preceding item, wherein the discontinuous layer of gold nanoparticles is in a range of 0.05 wt % to 5 wt % relative to the composite particle.
Item 11. The composite particle of any preceding item, having a powder volume resistivity value of at least $10^6$ ohm.cm.
Item 12. An article comprising:
 a substrate;
 a plurality of composite particles disposed on a surface of the substrate, disposed within the substrate, or both;
 wherein individual composite particles in the plurality of composite particles comprise:
  a fluorinated surface; and
  a discontinuous layer of gold nanoparticles disposed on the fluorinated surface.
Item 13. The article of item 12, wherein the substrate is in a form of any of a sheet, a film, a nonwoven web, or a plurality of particles.
Item 14. An article comprising:
 a container;
 a plurality of composite particles disposed within the container;
 wherein individual composite particles in the plurality of composite particles comprise:
  a fluorinated surface; and
  a discontinuous layer of gold nanoparticles disposed on the fluorinated surface.
Item 15. The article of item 14, wherein the container comprises any of a permeable bag, a tube defining an inlet and an outlet, or a nonwoven fibrous web.
Item 16. A method of removing ethylene, the method comprising:
 placing an ethylene removal agent in proximity to an ethylene-generating source, wherein the ethylene removal agent comprises:
  a plurality of composite particles, wherein individual composite particles in the plurality of composite particles comprise:
   a fluorinated surface; and
   a discontinuous layer of gold nanoparticles disposed on the fluorinated surface.
Item 17. The method of item 16, wherein the ethylene removal agent and the ethylene-generating source are within a closed system.
Item 18. The method of item 17, wherein the closed system includes means for augmenting gas flow from the ethylene generating source to ethylene removal agent.
Item 19. The method of any one of items 16 to 18, wherein the ethylene-generating source is any of harvested fruits, harvested vegetables, or harvested flowers.
Item 20. A refrigeration system, comprising the composite particle of any one of items 1 to 11.
Item 21. A method of making a composite particle, the method comprising:
 providing a core particle having a fluorinated surface;
 depositing gold nanoparticles on the fluorinated surface, to provide a discontinuous layer of gold nanoparticles on the fluorinated surface; and
 isolating the core particle having the discontinuous layer of gold nanoparticles disposed on the fluorinated surface.
Item 22. The method of item 21, wherein depositing gold nanoparticles comprises particle vapor deposition.
Item 23. The method of any one of items 21 to 22, wherein depositing gold nanoparticles is discontinued while a plurality of the composite particles has a powder volume resistivity value of at least $10^6$ ohm.cm.
Item 24. A composite particle comprising:
 a fluorinated surface; and
 a nonconductive layer of gold nanoparticles disposed on the fluorinated surface.
Item 25. The composite particle of item 24, wherein the fluorinated surface is a fluorinated coating on a core particle.
Item 26. The composite particle of item 25, wherein the core particle comprises any of carbonaceous material, zeolite, or metal oxide.
Item 27. The composite particle of item 25, wherein the core particle comprises activated carbon.
Item 28. The composite particle of any one of items 24 to 27, wherein the composite particle has an aspect ratio up to 1:10000.
Item 29. The composite particle of any any one of items 24 to 28, wherein the composite particle has a size in a range of from 0.1 micrometer to 10000 micrometers.
Item 30. The composite particle of any one of items 24 to 29, wherein the fluorinated surface comprises polytetrafluoroethylene.
Item 31. The composite particle of any one of items 24 to 30, wherein the core particle is suitable for removing moisture.
Item 32. The composite particle of any one of items 24 to 31, wherein the core particle is an adsorbent for volatile organic compounds.

Item 33. The composite particle of any one of items 24 to 32, wherein the nonconductive layer of gold nanoparticles is in a range of 0.05 wt % to 5 wt % relative to the composite particle.

Item 34. The composite particle of any one of items 24 to 33, having a powder volume resistivity value of at least $10^6$ ohm.cm.

Item 35. A method of removing ethylene, the method comprising:
placing an ethylene removal agent in proximity to an ethylene-generating source, wherein the ethylene removal agent comprises:
a plurality of composite particles, wherein individual composite particles in the plurality of composite particles comprise:
a fluorinated surface; and
a nonconductive layer of gold nanoparticles disposed on the fluorinated surface.

Item 36. The method of item 35, wherein the ethylene removal agent and the ethylene-generating source are within a closed system.

Item 37. The method of item 36, wherein the closed system includes means for augmenting gas flow from the ethylene generating source to ethylene removal agent.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Particle Vapor Deposition (PVD) Apparatus

Figure 2:
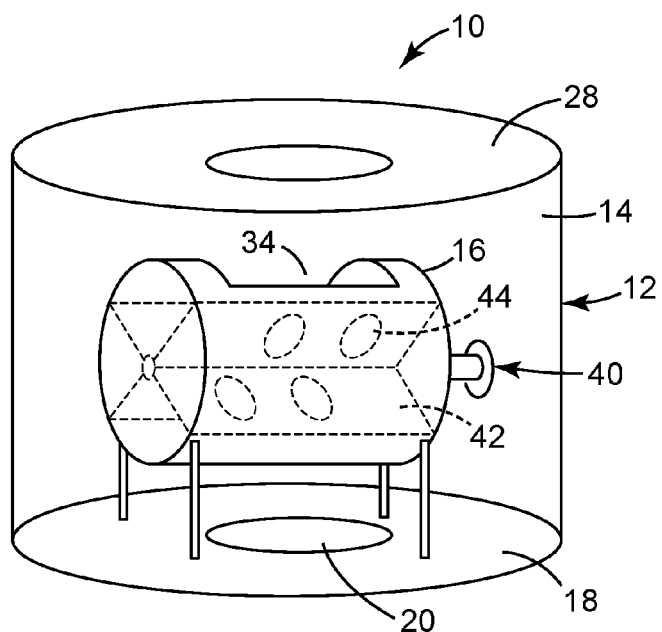
FIG. 2 is a schematic perspective view of the apparatus of FIG. 1.

An apparatus 10 used for carrying out an exemplary embodiment of the PVD process is shown in FIGS. 1 and 2. Apparatus 10 included housing 12 defining vacuum chamber 14 containing particle agitator 16. Housing 12, was a vertically oriented hollow cylinder (45 cm high and 50 cm in diameter). Base 18 defined port 20 for high vacuum gate valve 22 followed by a six-inch (15 cm) diffusion pump 24 as well as support 26 for particle agitator 16. Chamber 14 was capable of being evacuated to background pressures in the range of $10^{-6}$ torr ($1.3 \times 10^{-4}$ Pa).

The top of housing 12 included demountable, rubber L-gasket sealed plate 28 that was fitted with an external mount three-inch (7.6 centimeter) diameter direct-current magnetron sputter deposition source 30 (obtained from US, Inc., San Jose, Calif., under the trade designation "US GUN II"). Into sputter deposition source 30 was fastened gold sputter target 32 (7.6 cm (3.0 inch) diameter×0.48 cm (3/16 inch) thick). Sputter deposition source 30 was powered by a magnetron drive (obtained from Advanced Energy Industries, Inc, Fort Collins, Colo., under the trade designation "MDX-10 MAGNETRON DRIVE") fitted with an arc suppressor (Advanced Energy Industries, Inc, Fort Collins, Colo., under the trade designation "SPARC-LE 20").

Particle agitator 16 was a hollow cylinder (6 cm long×5.5 cm diameter horizontal) with a rectangular opening 34 (4.5 cm×3.5 cm) in the top 36. Opening 34 was positioned 7 cm directly below the surface 36 of gold sputter target 32 so that sputtered gold atoms could enter the agitator volume 38. Agitator 16 was fitted with shaft 40 aligned with its axis. Shaft 40 had a rectangular cross section (1 cm×1 cm) to which were bolted four rectangular blades 42 which formed an agitation mechanism or paddle wheel for the support particles being tumbled. Blades 42 each had two holes 44 therethrough to promote communication between the particle volumes contained in each of the four quadrants formed by blades 42 and particle agitator cylinder 16.

Example 1

Polytetrafluoroethylene (PTFE) powder (1 micrometer particle size, obtained from Alfa Aesar, Ward Hill, Mass.) was dry mixed with granular activated carbon (12×20 mesh, obtained from Kuraray Chemical Company, Houston, Tex. under trade designation "KURARAY GG 12×20") to form PTFE powder-coated carbon granules containing 12 wt % PTFE on carbon.

A 40 cc (17.68 g) portion of 12 wt % PTFE-powder coated carbon granules prepared above were dried for 5 hours at 150° C. in a convection oven. The dried particles were placed into the particle agitator 16 in vacuum chamber 14 of apparatus 10 described above. Vacuum chamber 14 was evacuated to $8 \times 10^{-6}$ Torr ($1.07 \times 10^{-3}$ Pa), and sufficient amount of argon sputtering gas (obtained from Oxygen Service Company., St. Paul, Minn.) was introduced to reach a pressure of about 10 millitorr (1.33 Pa). The nanogold deposition process was then started by applying a cathodic power of 60 Watts. Particle agitator shaft 40 was rotated at about 4 rpm during the nanogold deposition process. The cathodic power was discontinued after 1 hour. The vacuum chamber was backfilled with air and the nanogold-coated particles were removed. The gold sputter target 32 before the coating weighed 273.38 g, and after the coating weighed 271.60 g. Based on the capture efficiency of the agitator, the amount of gold coated on the PTFE powder-coated carbon granules was approximately 0.7 wt %.

The powder volume resistivity of the resulting gold-coated particles was measured using a test cell consisting of a thermoplastic block (made of an acetal resin commercially available from E.I. DuPont de Nemours and Company, Wilmington, Del. under trade designation "DELRIN") containing a cylindrical cavity with circular cross section of 1.0 $cm^2$. The bottom of the cavity was covered by a brass electrode. The second electrode was a 1.0 $cm^2$ cross section brass cylinder which fitted into the cavity. The gold-coated powder prepared above to be tested was placed in the cavity, then the brass cylinder inserted. A weight was placed on top of the brass cylinder to exert a total pressure of 18 psi (120 kPa) on the powder. The electrodes were connected to a digital multimeter to measure resistance. When the powder bed was 1.0 cm high the observed electrical resistance (ohm) was equivalent to the powder volume resistivity (ohm.cm). The powder volume resistivity of the gold coated particles of Example 1 was greater than $2 \times 10^6$ ohm.cm Comparative Example A Comparative Example A sample was the granular activated carbon used above in Example 1 without any further treatments.

Comparative Example B

The Comparative Example B sample was the PTFE powder-coated granular carbon prepared above in Example 1 without further treatments Comparative Example C Comparative Example C sample was prepared in the same manner as Example 1, except that the activated carbon granules were coated with 8 wt % of a magnetic Fe$_2$O$_3$ nono-powder (obtained from Alfa-Aesar, Ward Hill, Mass., under the trade designation "NANOARC MAGNETIC Fe$_2$O$_3$"), instead of PTFE powder.

Comparative Example D

Comparative Example D sample was prepared in the same manner as Example 1, except that the PTFE powder-coated carbon granules containing 12 wt % PTFE on granular carbon were coated with silver instead of gold by inserting silver targets in place of gold target in the PVD apparatus.

Ethylene Removal Test

The samples from Example 1 and Comparative Examples A-D were tested for their ethylene removing abilities. The ethylene removal testing was performed using a flow through, fixed bed reactor. The reactor was a 4.5 cm (o.d.)× 4.1 cm (i.d.) borosilicate glass tube with the sample packed into the tube using a vibratory feeder equipped with an electronic controller (obtained from FMC Technologies, Houston, Tex. under trade designations "SYNTRON MAGNETIC FEEDER FT0-C" and "POWERPULSE", respectively) to give a total sample bed volume of 25 mL. The sample was supported on a stainless steel mesh disk inside the glass reactor tube, and glass wool was inserted at either end of the tube to minimize media movement during the flowing of the challenge gases. Compressed ethylene gas mixture (containing 1000 ppm C$_2$H$_4$ in N$_2$, obtained from Oxygen Service Company, St. Paul, Minn.) and filtered compressed air (house air, filtered with through a 3M FILTER CARTRIDGE-2811, commercially available from 3M Company, St. Paul, Minn. under trade designation "3M FILTER CARTRIDGE-2811") were premixed prior to introduction into the reactor space, where mass flow controllers (obtained from Aalborg Instruments and Controls, Inc., Orangeburg, N.Y., under the trade designation "MODEL GFC17") were used to control the flow rates of the respective feed gases. The compressed air flow was pre-humidified prior to mixing with ethylene gas by passing the air over a heated water bath. A humidity controller (obtained from Watlow Electric Manufacturing Co., St. Louis, Mo., under the trade designation "SD SERIES PID CONTROLLER") was connected in feedback to an immersion heater coil (obtained from Watlow Electric Manufacturing Co., St. Louis, Mo.) immersed in the water bath and a humidity probe (obtained from Vaisala, Helsinki, Finland, under the trade designation "MODEL HMT100") located in the gas space downstream from the water bath to maintain the gas phase relative humidity near 99% at 22° C. All tests were performed at room temperature (~22° C.). The volumetric flow rates of C$_2$H$_4$ and air were adjusted to produce a challenge premix of 5 ppm C$_2$H$_4$ in air at a total flow rate of 1 L/min. Under these test conditions, a residence time of 1.5 seconds and gas hourly space velocity of 2,400 h$^{-1}$ were obtained. The exit gas from the reactor was passed directly into a variable-pathlength long path cell of an FTIR spectrometer (obtained from MIDAC Corporation, Westfield, Mass., under the trade designation "MIDAC M4100" including a "MODEL 16-V" long path cell). The path length of the gas cell was set to 10 meters, and data was acquired as an average of 64 scans every minute. The peak height of the infrared band located near 949 cm$^{-1}$ was used to quantify the concentration (ppm) of ethylene in the gas cell. Breakthrough curves were obtained by monitoring the ethylene concentration in the exit gas from the reactor over time. The time at which 50% of the input ethylene concentration was observed in the exit gas stream ($t_{1/2}$) was taken as a measure of the ethylene removal capacity of the media. Therefore, higher $t_{1/2}$ values indicate higher ethylene removal capacity under these conditions. The measured $t_{1/2}$ values for Example 1 and Comparative Examples A-D are summarized in Table 1.

TABLE 1

| Example | $t_{1/2}$ (min) |
|---------|-----------------|
| 1       | 11.10           |
| Comp. A | 4.81            |
| Comp. B | 4.45            |
| Comp. C | 6.38            |
| Comp. D | 4.95            |

All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A composite particle comprising:
   a fluorinated surface; and
   a discontinuous layer of gold nanoparticles disposed on the fluorinated surface;
   wherein the discontinuous layer of gold nanoparticles comprises a plurality of island-like regions of the gold nanoparticles;
   wherein the fluorinated surface is a fluorinated coating on a core particle; and
   wherein the core particle is suitable for removing moisture.

2. The composite particle of claim 1, wherein the core particle comprises any of carbonaceous material, zeolite, or metal oxide.

3. The composite particle of claim 1, wherein the core particle comprises activated carbon.

4. The composite particle of claim 1, wherein the composite particle has an aspect ratio in a range of from 1:10000 to 1:1.

5. The composite particle of claim 1, wherein the composite particle has a size in a range of from 0.1 micrometer to 10000 micrometers.

6. The composite particle of claim 1, wherein the fluorinated surface comprises polytetrafluoroethylene.

7. The composite particle of claim 1, wherein the core particle is an adsorbent for volatile organic compounds.

8. The composite particle of claim 1, wherein the discontinuous layer of gold nanoparticles is in a range of 0.05 wt % to 5 wt % relative to the composite particle.

9. The composite particle of claim 1, having a powder volume resistivity value of at least 10$^6$ ohm.cm.

10. An article comprising:
    a substrate;
    a plurality of composite particles disposed on a surface of the substrate, disposed within the substrate, or both;
    wherein individual composite particles in the plurality of composite particles comprise:
    a fluorinated surface; and
    a discontinuous layer of gold nanoparticles disposed on the fluorinated surface;
    wherein the discontinuous layer of gold nanoparticles comprises a plurality of island-like regions of the gold nanoparticles; and wherein the substrate is a container, and the surface of the substrate on which the plurality of the composite particles are deposited is within the container.

11. The article of claim 10, wherein the substrate is in a form of any of a sheet, a film, a nonwoven web, or a plurality of particles.

12. The article of claim 10, wherein the container comprises any of a permeable bag, a tube defining an inlet and an outlet, or a nonwoven web.

* * * * *

UNITED STATES PATENT AND TRADEMARK OFFICE
CERTIFICATE OF CORRECTION

PATENT NO. : 10,004,243 B2  
APPLICATION NO. : 15/220859  
DATED : June 26, 2018  
INVENTOR(S) : Evan Hajime It is certified that error appears in the above-identified patent and that said Letters Patent is hereby corrected as shown below:

On the Title Page

Column 1 (Notice)
Line 3, After "0 days." delete "days.".

Page 2, Column 1 (Related U.S. Application Data)
Line 2, Delete "12" and insert -- 22 --, therefor.

Page 2, Column 2 (Other Publications)
Line 7, Delete "A" and insert -- "A --, therefor.

In the Specification

Column 1
Line 16 (Approx.), Delete "stoichometric" and insert -- stoichiometric --, therefor.

Column 4
Line 32, After "thereof" insert -- . --.

Column 8
Line 56, After "any" delete "any".

Signed and Sealed this
Eighteenth Day of September, 2018

Andrei Iancu
*Director of the United States Patent and Trademark Office*